United States Patent
Gross et al.

(10) Patent No.: US 7,394,767 B2
(45) Date of Patent: Jul. 1, 2008

(54) DISTRIBUTED REDUNDANCY CAPACITY LICENSING IN A TELECOMMUNICATION NETWORK ELEMENT

(75) Inventors: Joel L. Gross, Gilbert, AZ (US); Mimi H. Hutchison, Keller, TX (US); Jose A. Laboy, Tempe, AZ (US); Karl E. Miller, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 663 days.

(21) Appl. No.: 11/095,451

(22) Filed: Mar. 31, 2005

(65) Prior Publication Data

US 2006/0221839 A1 Oct. 5, 2006

(51) Int. Cl.
*H04J 1/16* (2006.01)
*H04J 3/14* (2006.01)

(52) U.S. Cl. ....................... 370/241; 370/242

(58) Field of Classification Search .................. 370/241, 370/242, 244, 250, 252, 254, 468; 709/223–226
See application file for complete search history.

(56) References Cited

U.S. PATENT DOCUMENTS

| 5,666,486 | A | 9/1997 | Alfieri et al. |
| 5,742,757 | A | 4/1998 | Hamadani et al. |
| 6,502,079 | B1 | 12/2002 | Ball et al. |
| 6,975,864 | B2 | 12/2005 | Singhal et al. |
| 7,058,708 | B2 * | 6/2006 | Gold et al. ................... 709/224 |
| 2003/0069968 | A1 * | 4/2003 | O'Neil et al. ............... 709/225 |
| 2005/0169197 | A1 | 8/2005 | Salesky et al. |
| 2006/0080389 | A1 | 4/2006 | Powers et al. |
| 2006/0126536 | A1 * | 6/2006 | Patel et al. ................... 370/254 |
| 2006/0179013 | A1 * | 8/2006 | Beliveau et al. ................ 706/6 |
| 2007/0192769 | A1 * | 8/2007 | Mimura et al. .............. 719/316 |
| 2007/0240006 | A1 * | 10/2007 | Fung .......................... 713/323 |

\* cited by examiner

*Primary Examiner*—Ajit G Patel

(57) ABSTRACT

A method for sharing a total licensed pool between network elements is disclosed. In the method, each of the network elements has a fixed available capacity. In a first step, an offered load capacity limit based on the total licensed pool and the available capacity is determined. Next, each of the network elements communicates a message comprising the offered load capacity limit. Then, each of the network elements monitor for messages. If a message is not received from one of the network elements, the network element that is not communicating is considered a failed network element. Upon detection of the failed network element, the offered load capacity of the failed network element is redistributed.

19 Claims, 3 Drawing Sheets

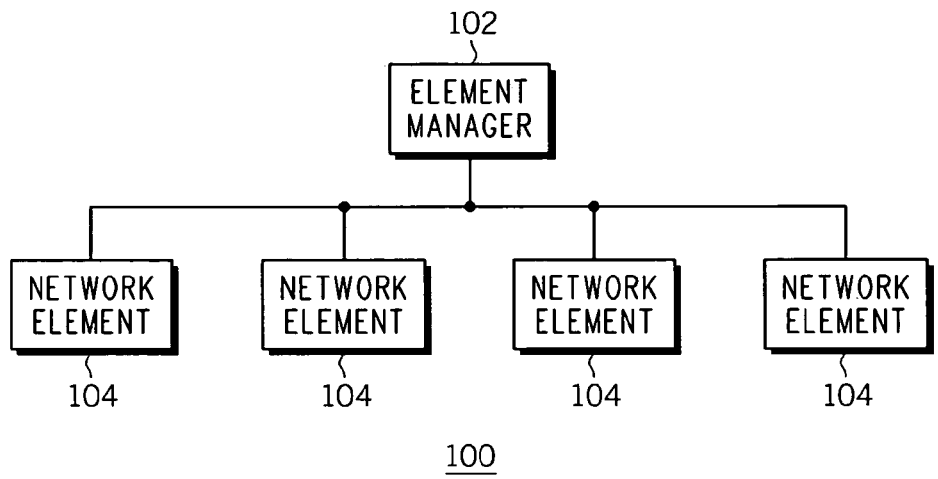
FIG. 1
FIG. 2
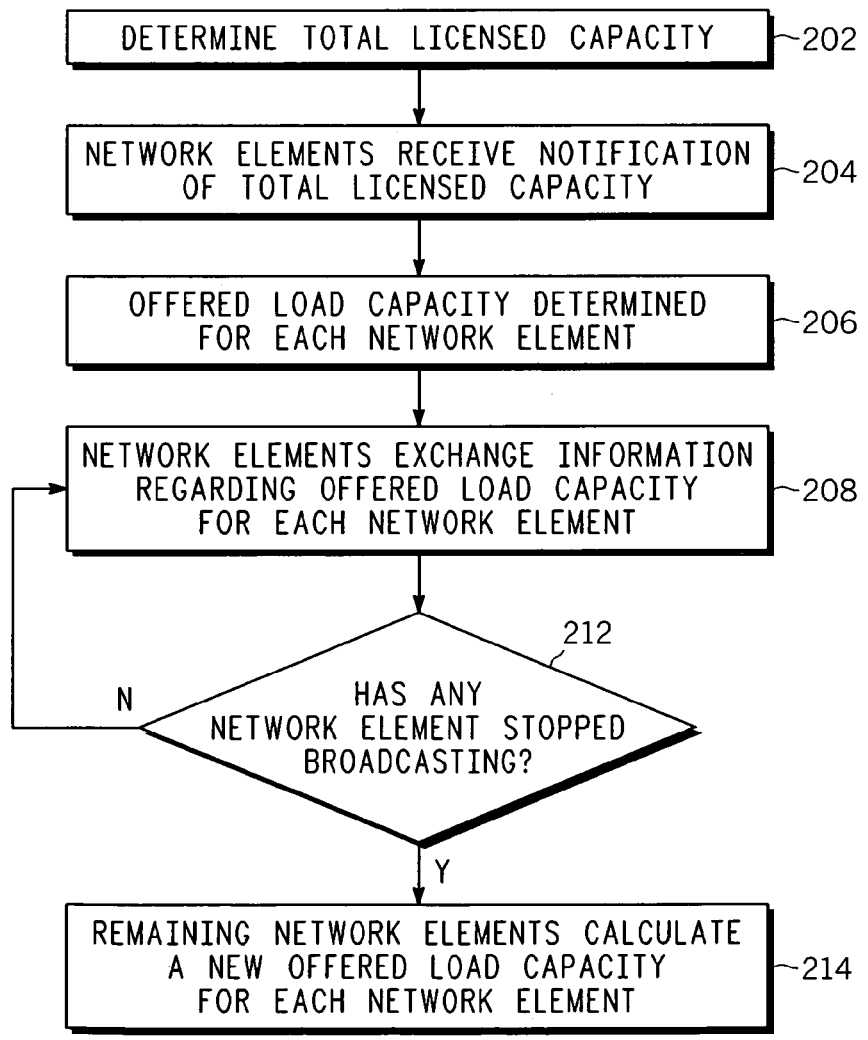

DISTRIBUTED REDUNDANCY CAPACITY LICENSING IN A TELECOMMUNICATION NETWORK ELEMENT

TECHNICAL FIELD OF THE INVENTION

This invention relates to the field of telecommunication and more specifically to distributed redundancy capacity licensing in a telecommunication network element.

BACKGROUND OF THE INVENTION

Telecommunication service providers typically purchase licenses for the software that runs on their telecommunication equipment. For example, a telecommunication system typically includes a plurality of network elements under the control of a network element controller. The network elements contain hardware, such as processors, that can provide telecommunication services. Each network element is designed to handle a certain amount of calls. In addition, network elements typically include redundant resources, such as redundant processors that can provide processing capabilities in the event of a failure in the system.

Software can be licensed in different ways. For example, licensing can be done on a per processor basis. In this embodiment, all processors in the network element must have a license to use the software. This includes any processors that are provided for redundancy purposes. From a customer standpoint, per processor based licensing is typically undesirable because the customer needs to buy extra licenses to cover redundant equipment.

Another way of licensing software is by capacity licensing. In typical capacity licensing schemes, a capacity license covers a maximum capacity of software use. For example, a capacity license may cover a number of calls the network element can process, a maximum number of users that can access the network element, or a maximum amount of network traffic the network element can handle. If a network element fails, other network elements can pick up the extra traffic if the other network elements have any available licensed capacity. If the network element does not have enough licensed capacity, the network element could not assume any more traffic, even if the network element has redundant processing capabilities that could handle the traffic. While this lack of licensed capability can be avoided by purchasing enough license capacity to cover all of the hardware in the network element, this forces the customer to purchase licenses for redundant resources.

Additionally, in current capacity license schemes a central platform or controller is needed to monitor the compliance with the license as well as distribute the licensed capacity. For example, in a telecommunication environment the element manager manages the capacity license for all network elements. Monitoring at the element manager level requires extra programming and uses up resources of the element manager. What is needed is distributed redundancy capacity licensing in a telecommunication network element.

BRIEF DESCRIPTION OF THE DRAWINGS

The present invention will hereinafter be described in conjunction with the following drawing figures, wherein like numerals denote like elements, and:

FIG. 1 is a block diagram of an exemplary communication system for use in the present invention;

FIG. 2 is a flowchart illustrating a method for use in the present invention;

DETAILED DESCRIPTION OF THE DRAWINGS

Figure 3:
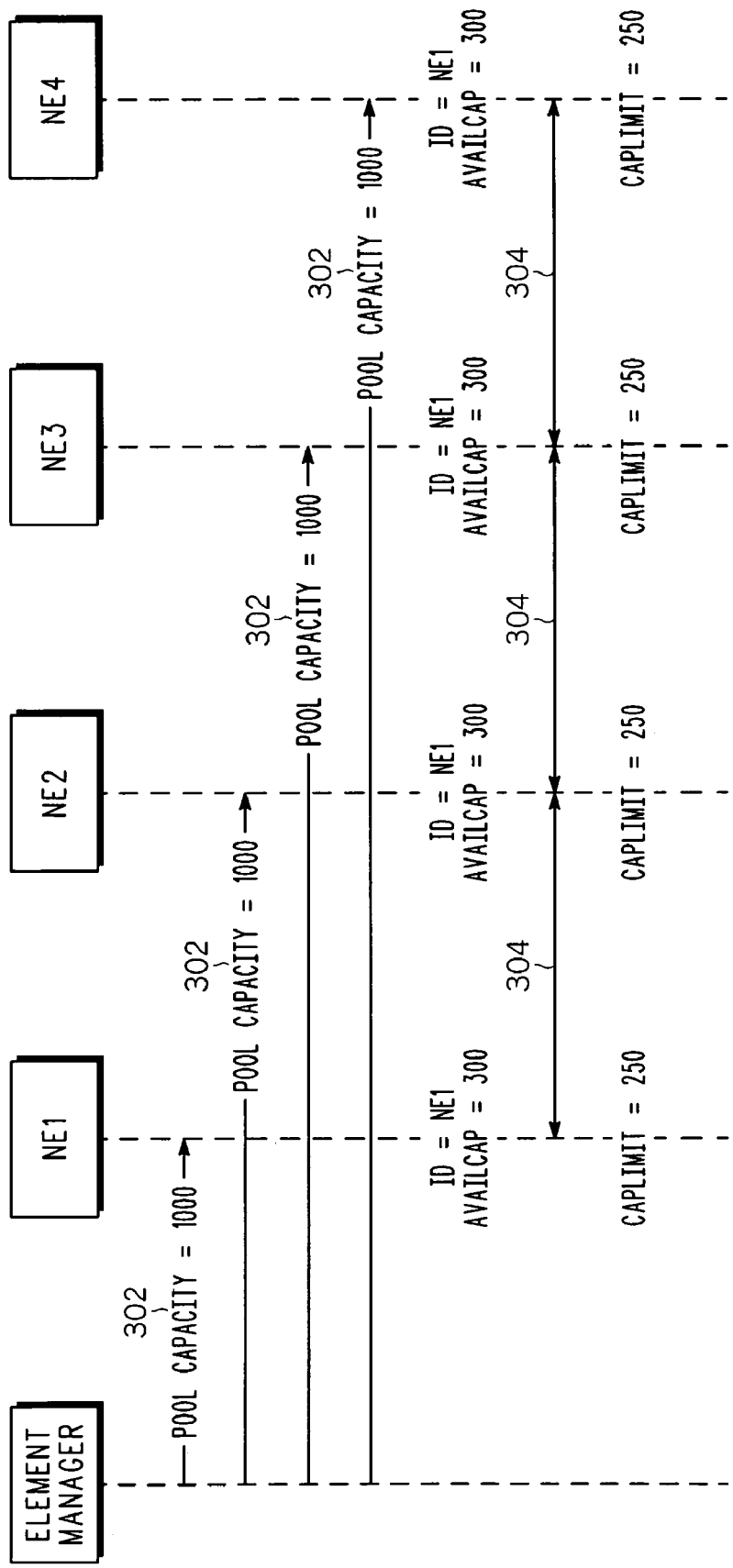
FIG. 3 is a sequence diagram of an exemplary embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

FIG. 1 is a block diagram of an exemplary communication system 100 for use with the present invention. The communication system 100 comprises an element manager 102 coupled to one or more network elements 104.

Element manager 102 controls the operation of the network elements 104. In the present inventions the element manager 102 tracks the total licensed capacity of all the network elements 104 under the control of the element manager 102.

Each network element 104 in communication system 100 can include redundant resources. Network element 104 can provide various telecommunication services. Network elements 104 can be any device capable of peer-to-peer communication and in which there is hardware that includes licensed software.

Network elements 104, in an exemplary embodiment of the present invention, receive information from the element manager 102 regarding a total capacity of a license pool for all network elements 104 in the system 100. In an exemplary embodiment, the total capacity of the license pool represents a maximum capacity that can be supported by the collection of network elements 104 under the capacity license. The total capacity of the license pool can be the total number of users that can access the software running on each of the network elements, the total number of calls that can be supported by each of the network elements 104, the amount of telephony traffic that can be handled by each of the network elements, and the like.

A method for distributing licensed capacity is illustrated in FIG. 2. In a first step, step 202, the total capacity of the license pool is determined. Typically, the total capacity of the license pool is a known amount and is provided to each of the network elements 104 by the element manager 102. As an example, a total capacity of the license pool may be 1,000 calls. Also, in step 202, the available capacity of each network element 104 is determined. The available capacity of each network element 104 is typically limited by the processing capability or other hardware constraints of the network element 104. For example, if the hardware of a network element 104 can support a maximum of 300 calls, the available capacity is 300 calls. The total available capacity limit is the sum of the available capacity of each network element. In the case of four identical network elements, the total available capacity is (4×300 calls)=1,200 calls. If the total capacity of the license pool is 1,000 calls, the total available capacity, in this example, exceeds the total capacity of the license pool and there is excess (or redundant) available capacity.

In step 204, the element manager 102 notifies each of the network elements 104 the total capacity of the license pool. In step 206, each network element 104 calculates an offered load capacity limit (CapLimit) using the actual capacity of each network element 104:

$$CapLimit = \left(\frac{AvailCap}{TotAvailCap}\right) * PoolCap \quad (1)$$

where AvailCap is the available capacity of the network element 104, TotAvailCap is the combined total available capacity for all the network elements 104 and PoolCap is the total capacity of the license pool. The offered load capacity limit is the licensed capacity for each network element 104.

In step 208, each of the network elements 104 transmit messages to the other network elements 104 that can include information such as an identification of the network element 104 sending the message, the available capacity of the network element 104, the offered load capacity limit for the network element 104, and the total capacity of the license pool. Additionally, each of the network elements 104 listens for messages sent by the other network elements 104. In step 212, it is determined if one or more network elements has stopped sending messages. If all of the network elements 104 are still sending messages, then the method returns to step 208 and the network elements 104 continue to send messages.

If at least one of the network elements 104 stops broadcasting the message it is assumed that the non-broadcasting network element 104 has failed and is unable to handle any capacity. In another embodiment, one of the network elements 104 can experience a partial failure, which results in a decrease in the available capacity of the network element. In this case, the partially failed network element will still broadcast a message to the other network elements 104; however, the available capacity reported by the partially failed network element 104 will decrease. The decrease in the available capacity will be detected by the other network elements. Therefore, a failed network element can be a network element that experiences a partial or entire loss in available capacity.

In one embodiment of the present invention, the offered load capacity limit of the failed network element 104 is redistributed amongst the remaining network elements 104. To determine the redistribution of licensed capacity, each of the remaining network elements 104 calculates a new offered load capacity limit (NewCapLimit):

$$NewCapLimit = \left(\frac{AvailCap}{TotalremAvailCap}\right) * PoolCap \quad (2)$$

where AvailCap is the available capacity of the network element, TotalremAvailCap is the new combined total available capacity of the remaining network elements 104 and PoolCap is the total capacity of the license pool (step 214). If the new offered load capacity limit exceeds the available capacity of the network elements 104, the available capacity is the new offered load capacity limit. Originally, the total licensed capacity was distributed between N network elements 104 of the system 100. After the failure of one of the network elements 104, the licensed capacity is redistributed over the N-1 remaining network elements 104. Therefore, in the present invention, licensed capacity can be assigned from a failed network element to the remaining network elements 104 without involving the use of a central controller such as the element manager 102. Additionally, redundant resources in the remaining network elements 104 can be covered by a license without having to purchase additional licensed capacity.

In an alternate embodiment, the failed network element experiences a partial failure that results in the available capacity for the failed network element to decrease. Each of the network elements 104 will compute a new offered load capacity limit using a new total remaining available capacity that reflects the loss of the available capacity of the failed network element 104. This results in the redistribution of the licensed capacity lost by the failed network element to the non-failing network elements 104.

In one embodiment of the present invention, when the failed network element 104 recovers, in order to allow the recovering network element 104 time to recover without excessive loading, the licensed capacity is not redistributed immediately. Thus, in one embodiment, the method of the present invention is characterized by a fast redistribution of licensed capacity between network elements 104 in the event of a failure of one of the network elements 104 and a slow recovery of the licensed capacity when the failed network element 104 returns to service.

FIG. 3 illustrates an exemplary embodiment of the present invention. In this exemplary embodiment, four network elements 104, NE1, NE2, NE3, and NE4, are coupled to the element manager 102. In this example, the total capacity of the license pool is 1,000 calls. Each of the network elements 104 has an available capacity of 300 calls. The element manager 102 initially sends a message 302 to each of the network elements 104 indicating the total capacity of the license pool.

Next, each of the network elements 104 calculates their offered load capacity limit using the known available capacity and capacity of the license pool:

$$CapLimit = \left(\frac{AvailCap}{TotAvailCap}\right) * PoolCap = \left(\frac{300}{1200}\right) * 1000 = 250$$

Therefore, the offered capacity limit is 250 calls for each network element 104. In one embodiment, each of the network elements 104 utilizes peer-to-peer communication to periodically broadcast a network element message 304 to the other network elements 104. The message, in one embodiment, includes the offered capacity limit, the available capacity, and the total pool capacity.

Figure 4:
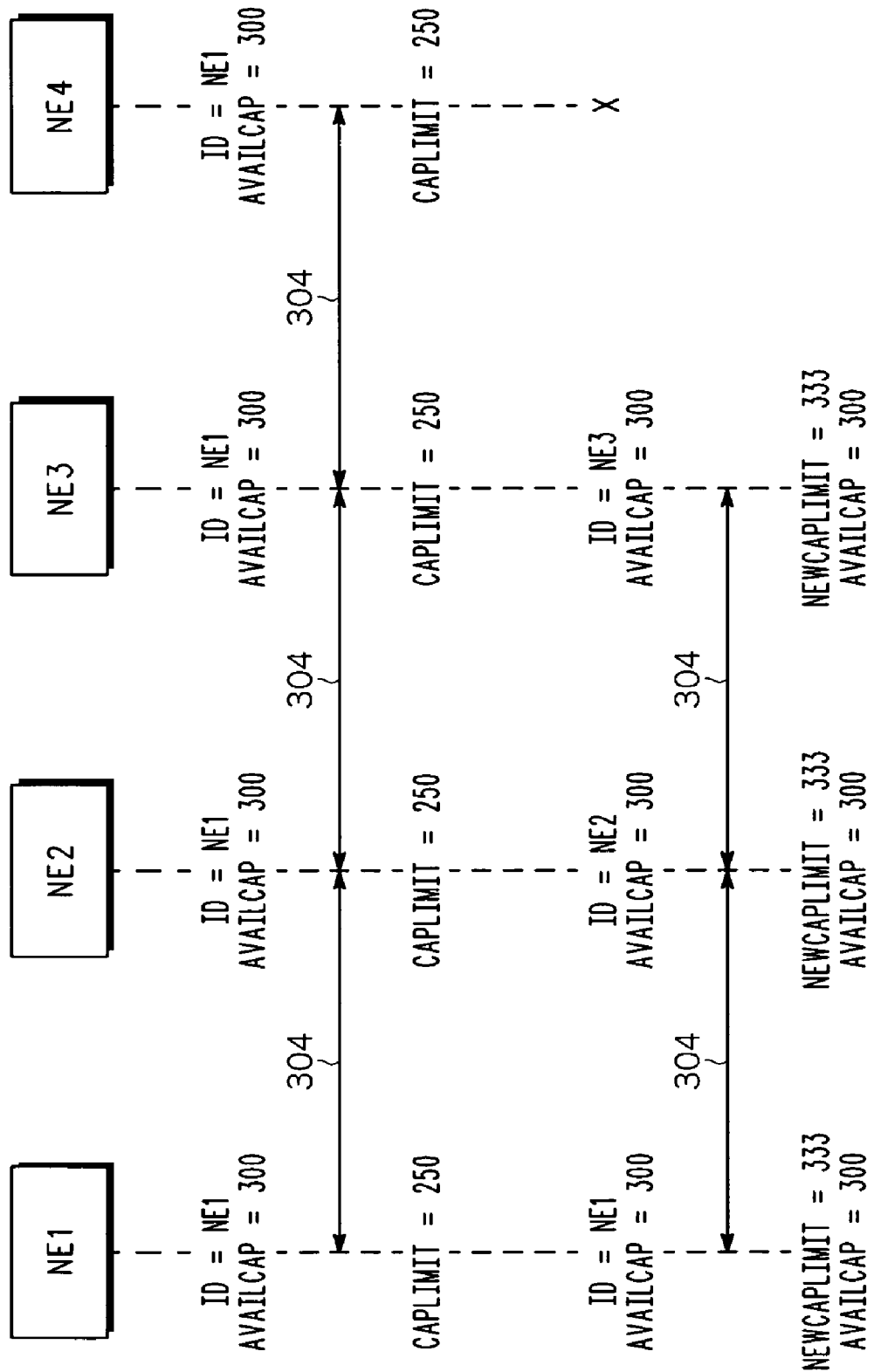
FIG. 4 is a sequence diagram of an exemplary embodiment of the present invention upon failure of a network element.

FIG. 4 illustrates the redistribution of licenses when one of the network elements 104 fails. The failure of one network elements 104 can be detected by the other network elements 104 because the failed network element 104 ceases to broadcast the network element message 304. Upon failure of one of the network elements 104, the total capacity of the license pool can be redistributed to the functioning network elements 104 so the functioning network elements 104 can compensate for the loss of the failed network elements 104. Originally, each of the network elements 104 had an offered load capacity limit of 250 calls. Since each of the network elements 104 could support a maximum of 300 calls (based on the available capacity), each network element 104 has excess capacity (redundant capacity) not covered by the license. When one of the network elements 104 fail, the remaining network elements 104 can determine the additional load that can be assumed by calculating the new offered load capacity limit (NewCapLimit):

$$NewCapLimit = \left(\frac{AvailCap}{TotalremAvailCap}\right) * PoolCap = \left(\frac{300}{900}\right) * 1000 \approx 333$$

Note that due to the loss of a network element 104, the total available capacity has decreased (the NewCapLimit in this example has been rounded down). Also, while the new calculated offered load capacity limit is 333 calls, each network element 104 can only handle 300 calls due to hardware constraints (the available capacity is 300 calls). Thus, the new offered capacity limit for each of the network elements 104 is 300 calls. The net effect is that redundant resources in each of the remaining network elements 104 are able to share the licensed capacity originally allocated to the failed network element 104.

When the failed network element 104 recovers and begins to rebroadcast its offered capacity limit to the other network elements 104, the offered load capacity limit returns to the steady state limit of 250 calls. In one embodiment, to avoid having the recovered network element 104 become overloaded by a high arrival rate of calls, for a short period, the total licensed capacity may increase to 1150 calls (the 900 calls for the three network elements 104 that did not fail and 250 calls for the recovered network element 104). Then, all of the network elements 104 return to their steady state capacity of 250 calls.

In the event the network element 104 experiences only a partial failure characterized by a drop in available capacity, the network elements 104 will calculate a new offered load capacity limit. For example, assume that each of the network elements 104; NE1, NE2, NE3, and NE4, has an available capacity of 300 calls and an offered capacity limit of 250 calls. If NE4 experiences a drop in available capacity from 300 calls to 150 calls, each of the other network elements; NE1, NE2, and NE3 will calculate a new offered load capacity limit, taking into account the decrease in the available capacity of NE4 and the resultant decrease in the total available capacity:

$$NewCapLimit = \left(\frac{AvailCap}{TotalremAvailCap}\right) * PoolCap = \left(\frac{300}{1050}\right) * 1000 \approx 286 \text{ calls}$$

where the total remaining available capacity is the available capacity of the non-failing network elements (300+300+300=900 calls) and the available capacity of the failed network element of 150 calls, for a total remaining available capacity of 1050 calls (the NewCapLimit in this example has been rounded up). NE4 will also calculate a new offered load capacity limit based on its new available capacity of 150 calls and the total remaining available capacity of 1050 calls:

$$NewCapLimit = \left(\frac{AvailCap}{TotalremAvailCap}\right) * PoolCap = \left(\frac{150}{1050}\right) * 1000 \approx 142 \text{ calls}.$$

Therefore, the present invention allows redundant resources in any network element 104 to be provided with additional licensed capacity in the event of a failure (partial or full failure) in the system (the NewCapLimit in this example has been rounded down). Thus, extra licenses for unused or redundant capacity need not be purchased for each redundant resource, such as redundant processors. Also, the reallocation of licensed capacity is done between the network elements 104 and does not require the use of the element manager 102.

While the present invention was illustrate using a telecommunication system as an exemplary embodiment, the present invention can be used in any environment where software or other goods and services are licensed using capacity licensing.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed:

1. A method for sharing a total licensed capacity pool between network elements, each of the network elements having an available capacity, the method comprising, for each of the network elements:
    determining an offered load capacity limit based on the total licensed capacity pool and the available capacity;
    communicating a message to each of the network elements comprising the offered load capacity limit;
    monitoring for messages sent from each of the network elements;
    detecting a failed network element when the message is not received from one of the network elements or the message indicates a decrease in the available capacity of one of the network elements; and
    upon detection of the failed network element, redistributing the offered load capacity limit of the failed network element.

2. The method of claim 1 where in the step of determining an offered load capacity limit further comprises calculating the offered load capacity(CapLimit) from:

$$CapLimit = \left(\frac{AvailCap}{TotAvailCap}\right) * PoolCap$$

where AvailCap is the available capacity each of the network elements, TotAvailCap is a total available capacity for all of the network elements and PoolCap is the total licensed capacity pool.

3. The method of claim 1 further comprising sending each of the network elements the total licensed capacity pool from a network controller.

4. The method of claim 1 wherein the step of redistributing the offered load capacity further comprises calculating a new offered load capacity limit from:

$$NewOfferCapLimit = \left(\frac{Availcap}{TotalremAvailCap}\right) * PoolCap$$

where NewOfferCapLimit is the new offered load capacity limit, AvailCap is the available capacity of each of the network elements, TotalremAvailCap is an available capacity of all the remaining network elements and PoolCap is the total licensed capacity pool.

5. The method of claim 1 further comprising determining the offered load capacity limit of each of the network elements after the failed network element recovers.

6. The method of claim 1 further comprising allowing the total system capacity to exceed the total licensed capacity pool during the recovery of the failed network element.

7. A method for distributing licensed capacity between a plurality of network elements, each of the network elements having a load capacity limit less than an available capacity, the method comprising, for each network element: detecting a failed network element from the plurality of network elements; and assigning the load capacity limit lost by the failed network element to all remaining network elements in the plurality of network elements, wherein the step of assigning the load capacity limit of the failed network element further comprises calculating a new load capacity limit for each of the remaining network elements:

$$NewCapLimit = \left(\frac{AvailCap}{TotalremAvailCap}\right) * PoolCap$$

where NewCapLimit is a new load capacity limit, AvailCap is the available capacity of each of the network elements, TotalremAvailCap is a total available capacity of all the remaining network elements and PoolCap is the total licensed capacity.

8. The method of claim 7 wherein the step of detecting a failed network element further comprises, for each network element:
monitoring for a message sent from each of the plurality of network elements; and
detecting a failed network element upon failure to receive the message from one of the plurality of network elements.

9. The method of claim 8 further comprising calculating the load capacity limit for each of the network elements as:

$$CapLimit = \left(\frac{AvailCap}{TotAvailCap}\right) * PoolCap$$

where CapLimit is the load capacity limit, AvailCap is the available capacity for each of the network elements, TotAvailCap is a combined available capacity of each of the network elements and PoolCap is the licensed capacity for all of the network elements.

10. The method of claim 7 wherein the step of detecting a failed network element further comprises, for each network element:
monitoring for a message sent from each of the plurality of network elements; and
detecting a failed network element upon the reception of the message that indicates a loss of available capacity of one of the plurality of network elements.

11. The method of claim 7 further comprising allowing the sum of the load capacity limit of the plurality of network elements to exceed the total licensed capacity during the recovery of the failed network element.

12. The method of claim 7 further comprises selecting the available capacity of each of the plurality of network elements as the new load limit if the calculated licensed capacity limit exceeds the available capacity.

13. A method for managing total licensed capacity between network elements, each of the network elements having a redundant resource component:
receiving at each of the network elements a notification of the total licensed capacity;
calculating for each of the network elements a steady state load capacity limit based on the total licensed capacity, and
upon failure of one of the network elements, determining a transient load capacity limit, the transient load capacity limit providing licensed capacity for at least part of the redundant resource component of each remaining network element.

14. The method of claim 13 further comprises:
monitoring for a message from each of the network elements; and
detecting a failed network element upon failure to receive the message from one of the network elements.

15. The method of claim 13 further comprising calculating the steady state load capacity limit for each of the network elements using:

$$CapLimit = \left(\frac{AvailCap}{TotAvailCap}\right) * PoolCap$$

where CapLimit is the steady state load capacity limit, AvailCap is an available capacity for each of the network elements, TotalAvailCap is a combined available capacity of the network elements and PoolCap is a total licensed capacity.

16. The method of claim 13 wherein the step of determining a transient load capacity limit further comprises calculating the transient load capacity limit using $$NewCapLimit = \left(\frac{AvailCap}{TotalremAvailCap}\right) * PoolCap$$

where NewCapLimit is the transient load capacity limit, AvailCap is an available capacity for each of the network elements, TotalremAvailCap is a summation of the available capacity of the network elements less the failed network element and PoolCap is the total licensed capacity.

17. The method of claim 13 wherein the step of detecting a failed network element further comprises, for each network element:
monitoring for a message sent from each of the other network elements; and
detecting a failed network element upon the reception of the message that indicates a loss of available capacity of one of the network elements.

18. The method of claim 13 further comprising allowing the transient load capacity limit to exceed the total licensed capacity during the recovery of the failed network element.

19. The method of claim 15 further comprising selecting the available capacity of each network element as the transient load capacity limit if the calculated transient load capacity exceeds the available capacity.

* * * * *